Jan. 16, 1923.
W. F. COLLINS.
TRACTOR.
FILED OCT. 5, 1920.
1,442,383.
2 SHEETS—SHEET 1.
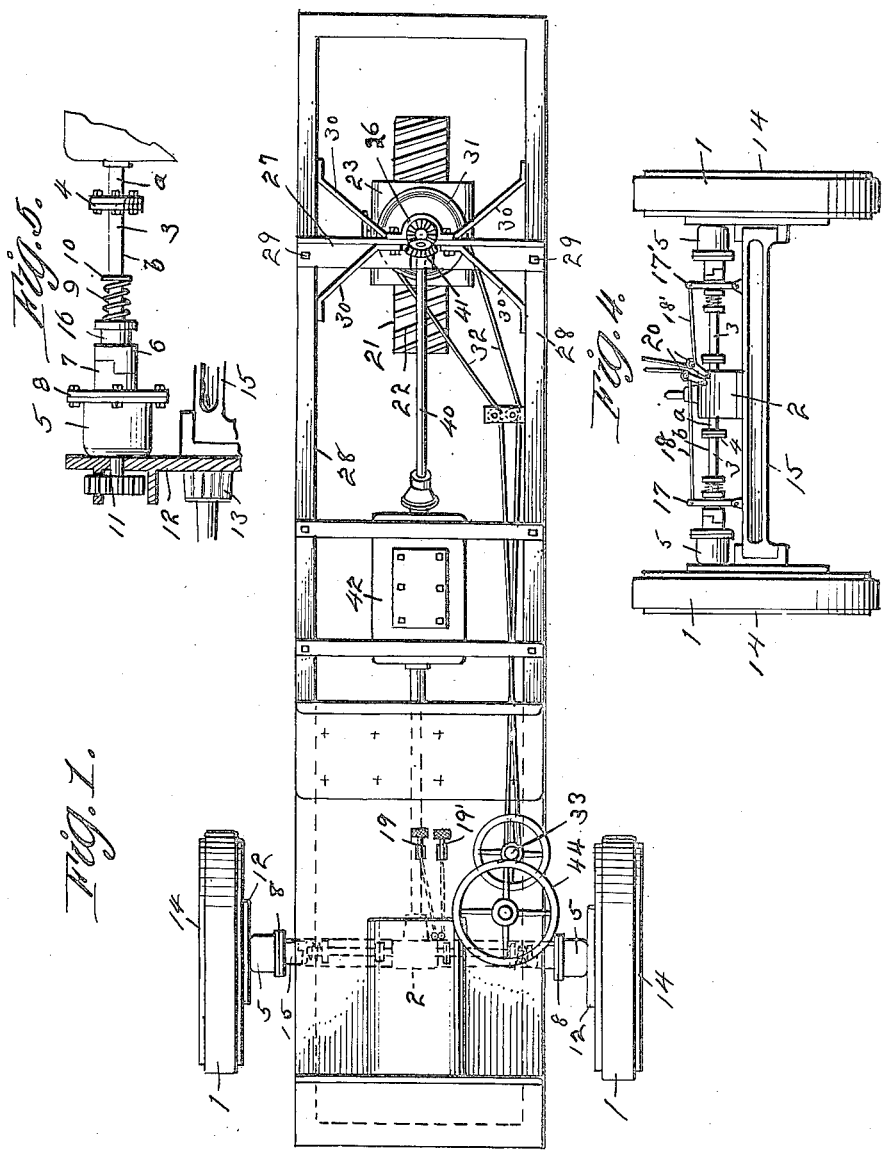
WITNESSES
Guy M Spring
Frank D O'Connell
Inventor
WALTER F. COLLINS
By Richard B Owen
Attorney

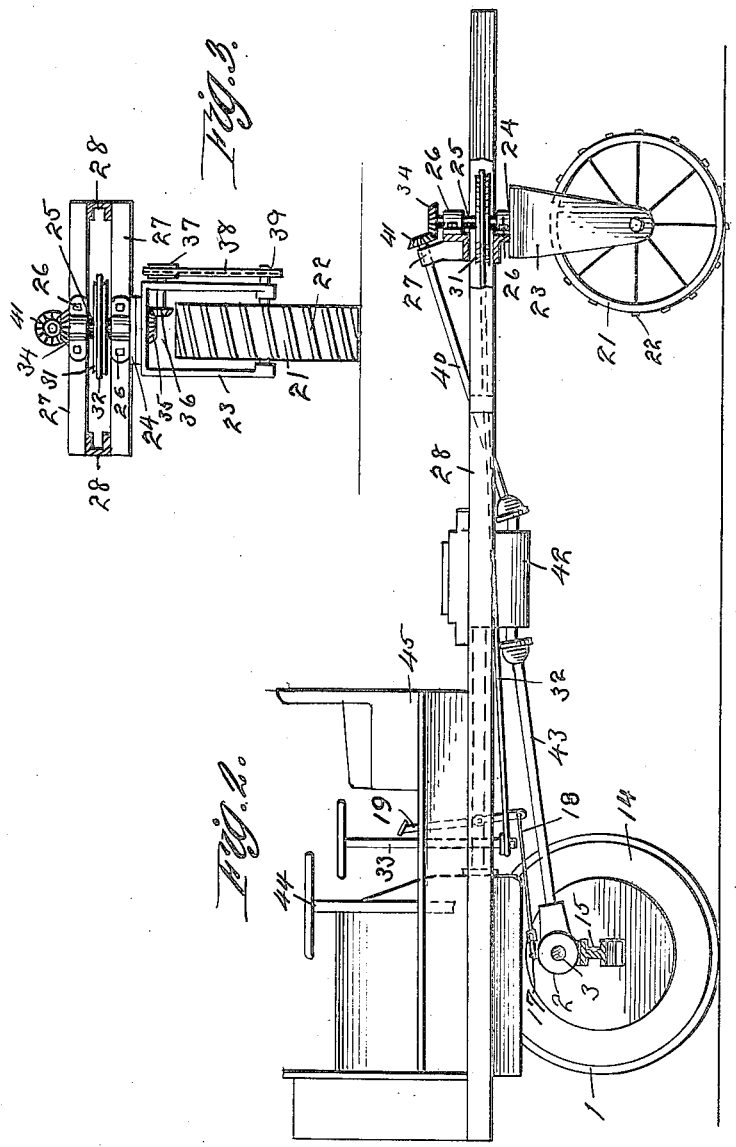

Patented Jan. 16, 1923.

1,442,383

UNITED STATES PATENT OFFICE.

WALTER F. COLLINS, OF PUEBLO, COLORADO.

TRACTOR.

Application filed October 5, 1920. Serial No. 414,787.

*To all whom it may concern:*

Be it known that I, WALTER F. COLLINS, a citizen of the United States, residing at Pueblo, in the county of Pueblo and State of Colorado, have invented certain new and useful Improvements in Tractors, of which the following is a specification.

This invention has reference to automobile trucks and tractors and contemplates the provision of means whereby an auto truck can be readily and conveniently changed into a tractor and be thus adapted for work, particularly around a farm, for which it would otherwise be unsuitable.

An additional object is to provide a truck-tractor of the character specified wherein the improved means are employed for clutching up the tractor wheels with the wheel drive whereby the power may be separately and independently cut off from one wheel independently of the other, thus enabling the tractor to pivot when it is desired to make a short turn.

A further object is to provide a tractor means capable, when applied to a truck, to efficiently adapt the same to the purposes for which a tractor is ordinarily employed and at the same time being readily replaceable by the removed truck parts whenever it is desired to change from a tractor into a motor truck.

With the above and other objects in view, the invention may be said to reside generally in the details of construction, combination and arrangement of parts as will be hereinafter more fully pointed out, reference being had to the accompanying drawings wherein—

Figure 1 is a plan view of a truck chassis transformed into a tractor in accordance with the invention.

Figure 2 is a side elevation thereof.

Figure 3 is a view of the rear or trailer end of the tractor.

Figure 4 is a view of the front or power end, showing the tractor wheels in place, and Figure 5 is a detailed view of the wheel-drive and knuckle assembly.

The invention is equally applicable to any of the well known types of trucks now in common use and is particularly adapted to a "Nash Quad" truck, the chassis of which is illustrated in the attached drawings with the tractor parts attached thereto as hereinafter explained. In applying the invention, the rear truck wheels are removed and steel rims put on the rubber tires of the front wheels. Fitted to the front wheels in place on the rubber tires, are metallic rims or traction treads 1 which serve to change the ordinary truck wheels into tractor wheels. These wheels are connected with the differential 2 by means of axle shafts 3 which, in the present instance, are divided into two sections, joined by their securing flanges, as indicated at 4, one section —a— being geared with the differential and the other section *b* extending toward the knuckle joint 5 in the usual manner. Keyed to each section *b* of the axle shaft so as to revolve therewith and slidably mounted adjacent the outer end is a clutch element 6, designed for engagement with a complementary clutch element 7, the latter however being provided with a flange for fastening engagement with the flange of the knuckle joint, as indicated at 8 in Figure 5 of the drawing. Clutch element 6 is normally held in engagement with element 7 through the expansive force of the spring 9, one end of which resting against collar 10 of the axle shaft while its opposite ends rests against the clutch. The knuckle joint 5 enables the wheels to be turned either to the right or left in the steering of the vehicle and without affecting the operation of the wheel drive, the spur gear 11 continually meshing with the internal ring gear (not shown) of the wheel and continuing to revolve the latter. The knuckle joint and spur gear mechanism are supported by a large circular plate 12 upon the roller bearing 13 of which the wheels 14 are rotatably supported, the entire device being pivotally connected to the cross beam 15 and forming the usual wheeled structure, common to trucks of this type. The invention resides in the provision of clutch elements 7 and 6 arranged for mutual engagement to clutch up the power or driving axle 3 with the spur driving-gear 11 when turning the wheels or disengaging the clutches for releasing the driving power. Embracing the clutch element 6 on one side of the differential casing and working in the groove thereof, is a lever 17 having its lower end pivotally supported and its upper end connected by means of a cable or rope 18 to the lower end of a foot pedal 19. A similar arrangement is had on the opposite side of the differential casing, as indicated at 17', the operating pedal 19' being close to foot pedal 19. By means of this arrangement it is possible to readily and conveniently operate the clutches for cutting off the power from either of the drive wheels 1 independently of each other, the connecting cables being passed over the pulley wheels 20 fastened to the differential case 2 as shown to advantage in Figure 4 thereby enabling either clutch to readily respond to the pressure applied to the foot pedals.

In place of the rear wheels of the truck a trailer wheel 21 is substituted and is provided with the usual ribbed tread 22. The trailer wheel is mounted to revolve upon an axle mounted in the bearings at the extremities of a U-shaped supporting frame 23, the upper end of which is bolted to the flanged end 24 of a hollow cylinder or sleeve 25. This sleeve is rotatably supported through vertically disposed socket bearings 26 carried by the cross bars 27. These cross bars are arranged to extend crosswise of the truck chassis, above and below the side frames 28 of the chassis to which they are connected by suitable fastening means 29 and braces 30. Formed exteriorly of the sleeve 25 is a grooved wheel 31 made solid with the tube so that they both revolve as one. Passing around the wheel is a rope or cable 32 the extremities of which are connected to the lower end of a shaft or steering column 33; the arrangement being such that as the steering is turned in one direction the sheave 31 will be turned to swing the trailer wheel 21 in the opposite direction. The steering of the trailer wheel is accomplished independently of the steering of the tractor and is within the ready control of the driver. Mounted upon a shaft extending centrally through the sleeve 25 is a gear 34, at the upper end and a gear 35 at the lower end. Gear 35 meshes with a smaller gear 36 mounted upon a shaft passing horizontally through one of the side arms of the trailer wheel frame 23 and having a sprocket 37 at its outer end. This sprocket is connected by means of chains 38 to a smaller sprocket keyed to the end of the trailer wheel axle as indicated at 39 in Figure 3 of the drawings. The driving of the trailer wheel through the gearing just described is accomplished by means of a driving shaft 40 having at one end a gear 41 meshing with gear 34 the other end being connected with the gearing of the transmission indicated at 42. A similar driving connection 43 extends between the transmission and the differential of the front axle. Both trailer and tractor wheels are thus power driven from the same source and the arrangement of the trailer wheel mountings enables it to be readily steered without interfering with the driving means. The steering post and wheel illustrated at 44 represents the usual steering apparatus of the truck and this, of course, is used for steering the tractor wheels in the usual manner.

When the parts are assembled as illustrated in Figures 1 and 2 of the drawing a truck-tractor of considerable power and utility is provided and capable of being put to various uses. When employed for plowing, the plows may be fastened below the seat 45 and to the front beam 15. Other implements such as hay-rakes, etc. may be likewise attached and used as occasion requires. With the wheels clutched up with the driving axle the field may be plowed in the usual manner, any slight variations in direction being accommodated by steering with the wheel 22. When a sharp turn is desired to be made the clutch controlling one of the wheels 14 is released. Immediately this sets the wheel free to rotate independently of the driving mechanism. The wheel 21 may then be turned at right angles to the frame and the machine will then pivot on the wheel which is not disengaged because of the greater frictional resistance to rotation of the engaged wheel over the disengaged wheel 14. Thus a turn without any advance movement may be made on either of the wheels 14. These clutch bearing axles are adapted to be used only when the truck is employed as a tractor and are consequently to be taken out and replaced by the usual and original axles of the truck when the latter is being changed back to its original character, the joints 4 and 8 permitting the interchange of axles.

It will thus be seen that by means of the attachments herein provided, it is possible to enlarge the range of usefulness of the ordinary hauling truck and to provide, in fact, a combination of truck and tractor capable of many and varied uses.

The foregoing description and the accompanying drawings have reference to the preferred or approved embodiment of my invention. It is to be understood however, that such changes may be made in construction and arrangement of parts, materials, dimensions, etc. as may prove expedient and fall within the scope of the appended claims.

Having thus fully described my invention what I claim as new and desire to secure by Letters Patent is:—

1. In a machine of the class described, a frame, a differential carried by said frame, driving means for said differential including a motor, a pair of ground wheels, sectional axles each connecting a respective ground wheel with the differential, clutches connecting the sections of respective wheels, means for selectively releasing said clutches, a steering wheel pivoted to rotate on a vertical axis, and means to impart power to said steering wheels.

2. In a machine of the class described, a frame, a differential carried by said frame, driving means for said differential including a motor, a pair of ground wheels, sectional axles each connecting a respective ground wheel with the differential, clutches connecting the sections of respective wheels, means for selectively releasing said clutches, a steering wheel pivoted to rotate on a vertical axis, and means connected to the motor and having operative connection with the steering wheel to rotate the same.

3. In a machine of the class described, a frame, a differential carried by said frame, driving means for said differential including a motor, a pair of ground wheels, sectional axles each connecting a respective ground wheel with the differential, clutches connecting the sections of respective wheels, means for selectively releasing said clutches, a steering wheel pivoted to rotate on a vertical axis, and means connected to the motor and having operative connection with the steering wheel to rotate the same, said means including a shaft driven from said motor, a vertical shaft on which the steering wheel is mounted, bevel gears connecting said shafts, a yoke supporting said wheel through which said shaft extends, a stub shaft extending through the sides of said yoke, bevel gears connecting the vertical and stub shafts, an axle having said steering wheel mounted thereon and extending through the arms of the yoke, sprockets mounted on the stub shaft of an axle and a chain connecting said sprockets.

In testimony whereof I affix my signature in presence of two witnesses.

WALTER F. COLLINS.

Witnesses:
W. J. COWHICK,
W. D. KOEN.